United States Patent
Wang et al.

(10) Patent No.: US 9,765,948 B2
(45) Date of Patent: Sep. 19, 2017

(54) OPTICAL FILM, LIGHT-EMITTING DEVICE AND DISPLAY DEVICE

(71) Applicant: BOE Technology Group Co., Ltd., Beijing (CN)

(72) Inventors: Shang Wang, Beijing (CN); Ki Man Kim, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 14/888,176

(22) PCT Filed: Apr. 16, 2015

(86) PCT No.: PCT/CN2015/076721
§ 371 (c)(1),
(2) Date: Oct. 30, 2015

(87) PCT Pub. No.: WO2016/082431
PCT Pub. Date: Jun. 2, 2016

(65) Prior Publication Data
US 2016/0334078 A1   Nov. 17, 2016

(30) Foreign Application Priority Data
Nov. 24, 2014 (CN) .......................... 2014 1 0680690

(51) Int. Cl.
*F21V 13/02*   (2006.01)
*F21V 5/02*   (2006.01)
(Continued)

(52) U.S. Cl.
CPC ................ *F21V 13/02* (2013.01); *F21V 5/02* (2013.01); *F21V 9/14* (2013.01); *F21V 9/16* (2013.01);
(Continued)

(58) Field of Classification Search
CPC ........................... G02B 6/0053; G02B 6/0036
See application file for complete search history.

(56) References Cited

U.S. PATENT DOCUMENTS 9,146,419 B1* 9/2015 Anandan ............... G02B 6/0035
2006/0068154 A1* 3/2006 Parce ..................... B82Y 20/00
428/76

FOREIGN PATENT DOCUMENTS

CN   103135281 A   6/2013
CN   104064658 A   9/2014
(Continued)

OTHER PUBLICATIONS

Aug. 10, 2015—International Search Report and Written Opinion Appn PCT/CN2015/076721 with English Tran.
(Continued)

*Primary Examiner* — Elmito Breval
(74) *Attorney, Agent, or Firm* — Banner & Witcoff, Ltd.

(57) ABSTRACT

An optical film, a light-emitting device and a display device are provided. The optical film includes a quantum rod film layer and a light transmission prism layer located on a light emergent side of the quantum rod film layer. The prism layer is configured at the light emergent side of the quantum rod film layer to converge the linearly polarized light transmitted by the quantum rod film layer, so that the brightness of the light located at the light emergent side of the whole optical film is increased.

20 Claims, 2 Drawing Sheets

(51) Int. Cl.
   *G02B 1/18*    (2015.01)
   *F21V 9/14*    (2006.01)
   *F21V 9/16*    (2006.01)
   *G02B 5/04*    (2006.01)
   *G02B 5/30*    (2006.01)
   *G02F 1/1335*  (2006.01)

(52) U.S. Cl.
   CPC .............. *G02B 1/18* (2015.01); *G02B 5/045* (2013.01); *G02B 5/3025* (2013.01); *G02B 5/3083* (2013.01); *G02F 1/133617* (2013.01); *G02F 1/1335* (2013.01)

(56) References Cited

FOREIGN PATENT DOCUMENTS

| | | |
|---|---|---|
| CN | 104360425 A | 2/2015 |
| CN | 204228988 U | 3/2015 |
| GB | 2477817 | 8/2011 |
| KR | 100663745 B1 | 1/2007 |
| KR | 20130059221 A | 6/2013 |
| WO | 2013064971 A2 | 5/2013 |

OTHER PUBLICATIONS

Mar. 4, 2016—(CN)—First Office Action Appn 201410680690.X with English Tran.

\* cited by examiner

OPTICAL FILM, LIGHT-EMITTING DEVICE AND DISPLAY DEVICE

The application is a U.S. National Phase Entry of International Application No. PCT/CN2015/076721 filed on Apr. 16, 2015, designating the United States of America and claiming priority to Chinese Patent Application No. 201410680690.X filed on Nov. 24, 2014. The present application claims priority to and the benefit of the above-identified applications and the above-identified applications are incorporated by reference herein in their entirety.

TECHNICAL FIELD

Embodiments of the present invention relate to an optical film, a light-emitting device and a display device.

BACKGROUND

A Quantum Rod (QR) and a Quantum Dot (QD) are in nanometer size. Since electrons and holes are quantum confinement, a continuous band structure becomes a discrete energy level structure with molecular properties, and it can emit fluorescence after being stimulated.

SUMMARY

Embodiments of the present invention provide an optical film, a light-emitting device and a display device.

An embodiment of the present invention provides an optical film, which comprises a quantum rod film layer and a prism layer located at the light emergent side of the quantum rod film layer.

In an example, a first side of the prism layer is a flat surface, a second side of the prism layer is an uneven surface having a plurality of prism structures, and the first side of the prism layer, which is the flat surface, is disposed against the quantum rod film layer.

In an example, the optical film provided by the embodiment of the present invention further comprises a protective film layer attached to the light incident side of the quantum rod film layer.

In an example, the optical film provided by the embodiment of the present invention further comprises a polarizing film layer disposed on a side of the protective film layer facing away from the quantum rod film layer.

In an example, the polarizing film layer is a circularly polarizing film layer.

In an example, in the optical film layer provided by the embodiment of the present invention, the polarizing film layer is disposed on the side of the protective film layer facing away from the quantum rod film layer, through a light transmission connection layer located between the protective film layer and the polarizing film layer.

In an example, in the optical film provided by the embodiment of the present invention, the light transmission layer has a phase deviation of zero, and has a depolarization degree less than 5%.

In an example, the optical film provided by the embodiment of the present invention further comprises a polarizing beam-splitting layer disposed on the side of the protective film layer facing away from the quantum rod film layer, and a ¼ phase film layer disposed on the side of the polarizing beam-splitting layer facing away from the quantum rod film layer.

In an example, in the optical film provided by the embodiment of the present invention, the polarizing beam-splitting layer is disposed on the side of the protective film layer facing away from the quantum rod film layer, through a first light transmission connection layer located between the protective film layer and the polarizing beam-splitting layer.

In an example, in the optical film provided by the embodiment of the present invention, the ¼ phase film layer is disposed on the side of the polarizing beam-splitting layer facing away from the quantum rod film layer, through a second light transmission connection layer located between the polarizing beam-splitting layer and the ¼ phase film layer.

In an example, in the optical film provided by the embodiment of the present invention, the first light transmission layer has a phase deviation of zero, and has a depolarization degree less than 5%.

In an example, in the optical film provided by the embodiment of the present invention, the second light transmission layer has a phase deviation of zero, and has a depolarization degree less than 5%.

In an example, an embodiment of the present invention provides a light-emitting device, which comprises a light source and any of the optical films provided by the embodiments of the present invention, wherein the light emitted by the light source transmits through the optical film.

In an example, the light emitted by the light source is blue light, and the quantum rod film layer emits blue linearly polarized light, red linearly polarized light, and/or green linearly polarized light after being irradiated by the blue light.

In an example, an embodiment of the present invention provides a display device, which comprises any of the light-emitting devices provided by the embodiments of the present invention.

BRIEF DESCRIPTION OF THE DRAWINGS

Embodiments of the present invention will be described in detail hereinafter in conjunction with accompanying drawings to allow those skilled in the art to understand the present invention more clearly, in which.

DETAILED DESCRIPTION

Figure 1:
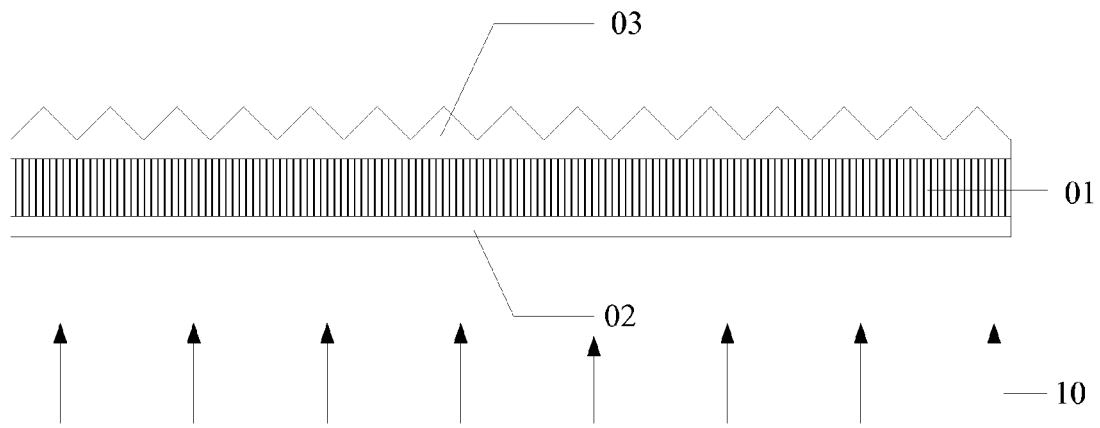
FIG. 1 is a first schematic structural view of an optical film according to an embodiment of the present invention.

Technical solutions according to the embodiments of the present invention will be described clearly and completely as below in conjunction with the accompanying drawings of embodiments of the present invention. It is to be understood that the described embodiments are only a part of but not all of exemplary embodiments of the present invention. Based on the described embodiments of the present invention, various other embodiments can be obtained by those of ordinary skill in the art without creative labor and those embodiments shall fall into the protection scope of the present invention.

Unless otherwise defined, all the technical and scientific terms used herein have the same meanings as commonly understood by one of ordinary skill in the art to which the present invention belongs. The terms, such as "first," "second," or the like, which are used in the description and the claims of the present application, are not intended to indicate any sequence, amount or importance, but for distinguishing various components. Also, the terms, such as "a/an," "one," or the like, are not intended to limit the amount, but for indicating the existence of at lease one. The terms, such as "comprise/comprising," "include/including," or the like are intended to specify that the elements or the objects stated before these terms encompass the elements or the objects and equivalents thereof listed after these terms, but not preclude other elements or objects. The terms, "on," "under," or the like are only used to indicate relative position relationship, and when the position of the object which is described is changed, the relative position relationship may be changed accordingly.

It should be noted that the thickness of each film layer does not reflect the true thickness or proportions of the optical film in the drawings, and the purpose of such showing is only to schematically illustrate the contents of the present invention.

Currently, quantum dots have been widely used, and the quantum dots are acted as molecular probes for applying into fluorescent labels, or applying into display devices by using the light-emitting properties of quantum dots. A monochromatic quantum dot is used as a light source of a light-emitting device in a liquid crystal display. The monochromatic quantum dot emits a monochromatic light after being irradiated by a blue LED, which mixes with the blue light to form a white background light, and the white background light has a larger color gamut, which can improve the picture quality.

However, the application of the quantum rod is limited to the use of a quantum rod forming an optical film, so as to take advantage of the polarization properties of the quantum rod to convert the natural light with a certain wavelength irradiated to the optical film into partially polarized light with another wavelength. The light transmitted by the optical film is diffuse light, therefore the light located at light emergent side of the optical film has lower brightness.

Therefore, a technical problem sought to be solved by those skilled in the art is how to improve the brightness of the light located at the light emergent side.

Embodiment of the present invention provides an optical film, which can improve the brightness of the light located at the light emergent side.

According to an embodiment of the present invention, as shown in FIG. 1, an optical film comprises a quantum rod film layer 01 and a prism layer 03 located at the light emergent side of the quantum rod film layer.

In the optical film provided by the embodiment of the present invention, the prism layer 03 is configured at the light emergent side of the quantum rod film layer to converge the linearly polarized light transmitted by the quantum rod film layer 01, so as to improve the brightness of the light located at the light emergent side of the whole optical film.

For example, in the optical film provided by the embodiment of the present invention, as shown in FIG. 1, a first side of the prism layer 03 is a flat surface, a second side of the prism layer 03 is an uneven surface having a plurality of prism structures, and the first side of the prism layer 03, which is a flat surface, is disposed against (directly contacts) the quantum rod film layer 01. However, in the conventional art, the prism layer is not disposed against the light-emitting layer (e.g., quantum dot material), thereby there is a gap between the prism layer and the light-emitting layer, i.e. there is an air layer between the prism layer and the light-emitting layer. Due to the air layer, even if the light emitted from the light-emitting layer is a polarized light, a portion of the light will be depolarized or totally reflected after passing through the air layer, therefore, it will affect the utilization of light and reduce the brightness. In the embodiments of the present invention, the prism layer is disposed against the quantum rod film layer, and there is no air layer between them, so it not only can reduce the thickness of the optical film, but it also can avoid depolarization and total reflection of the light when the light pass through the air layer (optically thinner medium) from the quantum rod film layer (optically denser medium), thereby it improves the utilization of light and the brightness of light transmitted by the whole optical film. When the prism layer is disposed against the quantum rod film layer, the prism layer can also be used as a protective film layer at the light emergent side of the quantum rod film layer, thereby preventing the light emergent side of the quantum rod film layer contacting water and oxygen in the air.

For example, in the optical film provided by the embodiment of the present invention, as shown in FIG. 1, the optical film further comprises a protective film layer 02 attached to the light incident side of the quantum rod film layer 01. In this way, the protective film can prevent the light incident side of the quantum rod film layer 01 having a contact with water and oxygen in the air.

Figure 2:
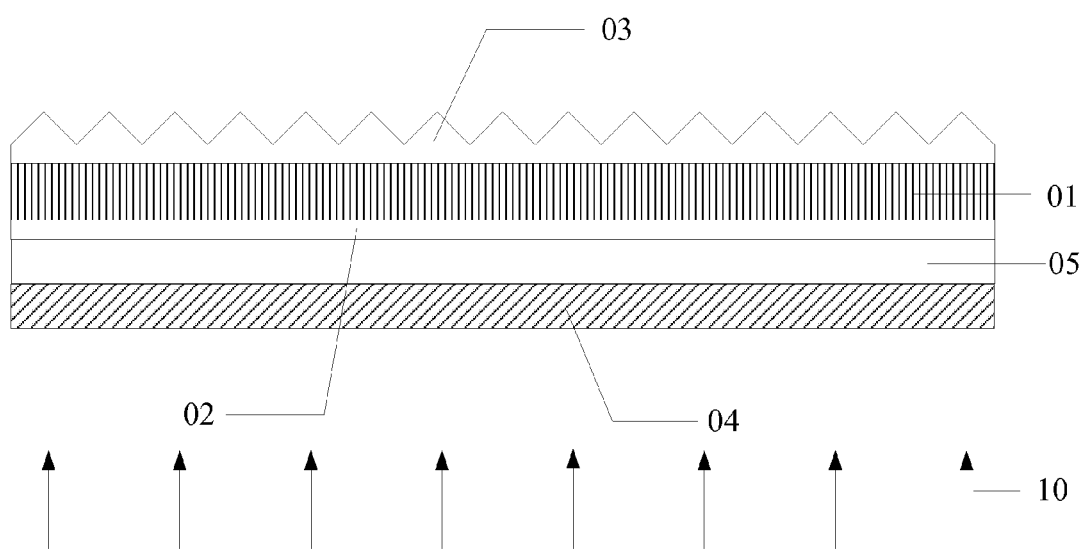
FIG. 2 is a second schematic structural view of an optical film according to an embodiment of the present invention.

For example, in the optical film provided by the embodiment of the present invention, as shown in FIG. 2, the optical film further comprises a polarizing film layer 04 disposed on a side of the protective film layer 02, which faces away from the quantum rod film layer 01. In this way, the light 10 is firstly converted into a linearly polarized light by using the polarizing film layer 04 before the light transmits through the quantum rod film layer 01, thereby it increases the polarization degree of the light transmitted by the optical film.

For example, in the optical film provided by the embodiment of the present invention, the polarizing film layer 04 is a circularly polarizing film layer.

For example, in the optical film provided by the embodiment of the present invention, as shown in FIG. 2, the polarizing film layer 04 is disposed on the side of the protective film layer 02 facing away from the quantum rod film layer 01, through a light transmission connection layer 05 located between the protective film layer 02 and the polarizing film layer 04. The protective film layer 02 can be formed by depositing polyethylene terephthalate (PET).

For example, in order to avoid the light transmission connection layer affecting the optical efficiency of the whole optical film, in the optical film provided by the embodiment of the present invention, the light transmission layer has a phase deviation of zero, and has a depolarization degree less than 5%. For example, the light transmission connection layer is an adhesive layer, and the adhesive layer can be selected from transparent optical materials which has a little phase delay, such as polyvinyl alcohol (PVA), polycarbonate (PC), optically clear adhesive (OCA), polymethylmethacrylate (PMMA) or the like, so that the light transmitted by the light transmission connection layer has a phase deviation of zero, and has a depolarization degree less than 5%.

It should be noted that the phase deviation refers to the phase change of the light after the light passing through the light transmission connection layer. Therefore, the light transmission connection layer has a phase deviation of zero, which means that the phase of light is not changed after the light passes through the light transmission connection layer. The depolarization degree is used to refer to a degree of the light transmission connection layer damaging a linear polarization state of the linearly polarized light. The smaller the depolarization degree is, the smaller the damage to the linear polarization state of the linearly polarized light is.

Figure 3:
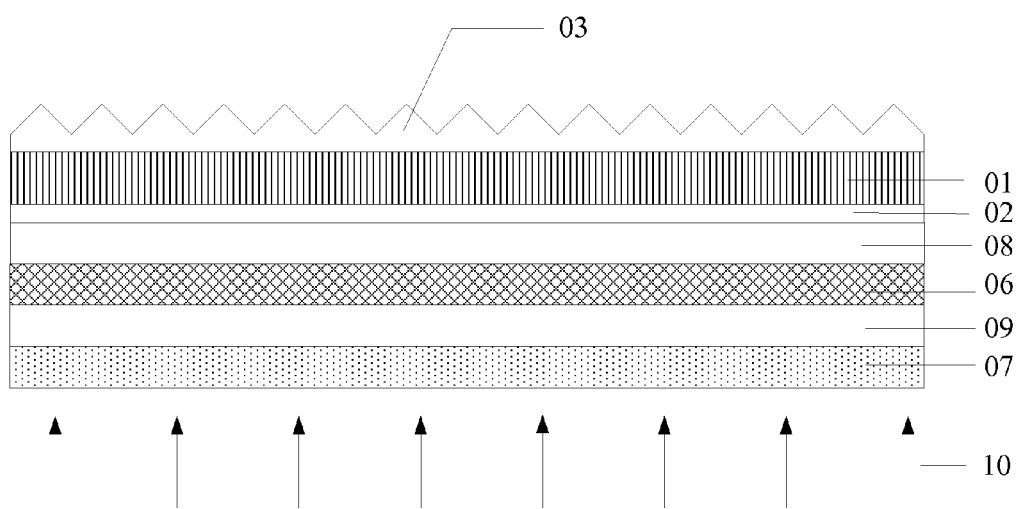
FIG. 3 is a third schematic structural view of an optical film according to an embodiment of the present invention.

Alternately, for example, in order to increase the polarization degree of the light transmitted by the optical film and the effective utilization of the light, in the optical film provided by the embodiment of the present invention, as shown in FIG. 3, the optical film further includes a polarizing beam-splitting layer 06 disposed on the side of the protective film layer 02, which faces away from the quantum rod film layer 01, and a ¼ phase film layer 07 disposed on the side of the polarizing beam-splitting layer 06, which faces away from the quantum rod film layer 01.

In this way, the light is firstly converted into two linearly polarized light components, of which polarization directions are perpendicular to each other, by using the polarizing beam-splitting layer before the light transmits through the quantum rod film layer, wherein the linearly polarized light, of which the polarization direction is perpendicular to the polarizing beam-splitting layer, irradiates on the quantum rod film layer after it transmits through the polarizing beam-splitting layer, thereby it can allow the light irradiates on the quantum rod film layer to be a linearly polarized light and can increase the polarization degree of the light transmitted by the optical film; and the linearly polarized light, of which the polarization direction is parallel to the polarizing beam-splitting layer, is reflected by the polarizing beam-splitting layer, and the reflected linearly polarized light is converted into a circularly polarized light after transmitting through a ¼ phase film layer, so that the circularly polarized light irradiates on the optical film again after being reflected, and another portion of the circularly polarized light is converted into a linearly polarized light, of which the polarization direction is perpendicular to the polarizing beam-splitting layer, so that it can substantially increase the utilization of the light.

For example, in the optical film provided by the embodiment of the present invention, as shown in FIG. 3, the polarizing beam-splitting layer 06 is disposed on the side of the protective film layer 02, which faces away from the quantum rod film layer 01, through a first light transmission connection layer 08 located between the protective film layer 02 and the polarizing beam-splitting layer 06.

For example, in the optical film provided by the embodiment of the present invention, as shown in FIG. 3, the ¼ phase film layer 07 is disposed on a side of the polarizing beam-splitting layer 06, which faces away from the quantum rod film layer 01, through a second light transmission connection layer 09 located between the polarizing beam-splitting layer 06 and the ¼ phase film layer 07.

For example, in the optical film provided by the embodiment of the present invention, as shown in FIG. 3, the polarizing beam-splitting layer 06 is disposed on the side of the protective film layer 02, which faces away from the quantum rod film layer 01, through a first light transmission connection layer 08 located between the protective film layer 02 and the polarizing beam-splitting layer 06; and the ¼ phase film layer 07 is disposed on the side of the polarizing beam-splitting layer 06, which faces away from the quantum rod film layer 01, through a second light transmission connection layer 09 located between the polarizing beam-splitting layer 06 and the ¼ phase film layer 07.

For example, in order to avoid the light transmission connection layer affecting the optical efficiency of the whole optical film, in the optical film provided by the embodiment of the present invention, the first light transmission layer has a phase deviation of zero, and has a depolarization degree less than 5%. For example, the first light transmission connection layer is an adhesive layer. The adhesive layer can be selected from transparent optical materials which has a little phase delay, such as polyvinyl alcohol (PVA), polycarbonate (PC), optically clear adhesive (OCA), polymethylmethacrylate (PMMA) or the like, so that the light transmitted by the first light transmission connection layer has a phase deviation of zero, and has a depolarization degree less than 5%.

For example, in order to avoid the light transmission connection layer affecting the optical efficiency of the whole optical film, in the optical film provided by the embodiment of the present invention, the second light transmission layer has a phase deviation of zero, and has a depolarization degree less than 5%. For example, the second light transmission connection layer is an adhesive layer. The adhesive layer can be selected from transparent optical materials which has a little phase delay, such as polyvinyl alcohol (PVA), polycarbonate (PC), optically clear adhesive (OCA), polymethylmethacrylate (PMMA) or the like, so that the light transmitted by the second light transmission connection layer has a phase deviation of zero, and has a depolarization degree less than 5%.

Based on the same inventive concept, an embodiment of the present invention provides a light-emitting device, which includes a light source and any of the optical films provided by the embodiments of the present invention, wherein the light emitted by the light source transmits through the optical film.

In the light-emitting device provided by the embodiment of the present invention, since the light emitted by the light source transmits through the optical film, it can use the optical film to increase the brightness of the light-emitting device.

For example, in the light-emitting device provided by the embodiment of the present invention, the light emitted by the light source is blue light.

The quantum rod film layer emits blue linearly polarized light, red linearly polarized light, and/or green linearly polarized light after being irradiated by the blue light.

In the light-emitting device provided by the embodiment of the present invention, the color of the light emitted by the quantum rod film layer after being irradiated is related to the material and size of the quantum rod in the quantum rod film layer, the quantum rods formed with different materials emit different colors of light, and the quantum rods formed with same materials, but with different sizes, also emit different colors of light. The theory is the same as that the prior art, and is not repeated herein.

In the light-emitting device provided by the embodiment of the present invention, the blue light emitted by the light source is converted into blue linearly polarized light, red linearly polarized light, and green linearly polarized light after transmitting through the optical film, and the three colors of the light mix to form white linearly polarized light. As is known, as a passive light-emitting display, a liquid crystal display device achieves the displaying by using the light emitted by a backlight source, and the light emitted by the backlight source needs to be polarized before it can be used by the liquid crystal display device. Since the quantum rod film layer in the light-emitting device can convert monochromatic natural light into white linearly polarized light required by a liquid crystal display device, the use of the light-emitting device as a backlight of a liquid crystal display device can significantly increase the optical efficiency of the liquid crystal display device.

Based on the same inventive concept, an embodiment of the present invention provides a display device, which includes any of the light-emitting devices provided by the embodiments of the present invention. The principle of the display device solving problems is similar to that of the aforementioned light-emitting devices, the implementation of the display device can refer to that of the aforementioned light-emitting device, which is not repeated herein.

The embodiments of the present invention provide an optical film, a light-emitting device and a display device. The optical film includes a quantum rod film layer and a light transmission prism layer located at the light emergent side of the quantum rod film layer. A prism layer is configured at the light emergent side of the quantum rod film layer to converge the linearly polarized light transmitted by the quantum rod film layer, so that the brightness of the light located at the light emergent side of the whole optical film is increased.

It should be understood that the described above are only illustrative implementations of the present invention, and the present invention is not intended to limited thereto. For an ordinary skill in the art, various variations and substitutions may be made without departing from the technology of the present invention, and these variations, substitutions and equivalents thereof shall fall within the protection scope of the present invention. The scope protected by the present invention is defined by the claims.

The present application claims the priority of Chinese patent application No. 201410680690.X filed on Nov. 24, 2014 and entitled "OPTICAL FILM, LIGHT-EMITTING DEVICE AND DISPLAY DEVICE", the entire contents of which are incorporated herein by reference.

What is claimed is:

1. An optical film, comprising:
   a quantum rod film layer and a prism layer located at a light emergent side of the quantum rod film layer, wherein a first side of the prism layer is a flat surface, a second side of the prism layer is an uneven surface having a plurality of prism structures, and the first side of the prism layer directly contacts the quantum rod film layer;
   a protective film layer attached to a light incident side of the quantum rod film layer; and
   a polarizing film layer disposed on a side of the protective film layer facing away from the quantum rod film layer.

2. The optical film according to claim 1, wherein the polarizing film layer is a circularly polarizing film layer.

3. The optical film according to claim 2, further comprising a light transmission connection layer, wherein the light transmission connection layer is located between the protective film layer and the polarizing film layer, and is disposed on the side of the protective film layer facing away from the quantum rod film layer.

4. The optical film according to claim 3, further comprising:
   a polarizing beam-splitting layer disposed on the side of the protective film layer facing away from the quantum rod film layer; and
   a ¼ phase film layer disposed on the side of the polarizing beam-splitting layer facing away from the quantum rod film layer.

5. The optical film according to claim 3, wherein the light transmission connection layer has a phase deviation of zero, and has a depolarization degree less than 5%.

6. The optical film according to claim 5, further comprising:
   a polarizing beam-splitting layer disposed on the side of the protective film layer facing away from the quantum rod film layer; and
   a ¼ phase film layer disposed on the side of the polarizing beam-splitting layer facing away from the quantum rod film layer.

7. The optical film according to claim 3, wherein the light transmission connection layer comprises a first light transmission connection layer and a second light transmission connection layer.

8. The optical film according to claim 7, further comprising:
   a polarizing beam-splitting layer disposed on the side of the protective film layer facing away from the quantum rod film layer; and
   a ¼ phase film layer disposed on the side of the polarizing beam-splitting layer facing away from the quantum rod film layer.

9. The optical film according to claim 8, wherein the polarizing beam-splitting layer is disposed on the side of the protective film layer facing away from the quantum rod film layer, through the first light transmission connection layer located between the protective film layer and the polarizing beam-splitting layer.

10. The optical film according to claim 9, wherein the ¼ phase film layer is disposed on the side of the polarizing beam-splitting layer facing away from the quantum rod film layer, through the second light transmission connection layer located between the polarizing beam-splitting layer and the ¼ phase film layer.

11. The optical film according to claim 10, wherein each of the first light transmission connection layer and the second light transmission connection layer has a phase deviation of zero, and has a depolarization degree less than 5%.

12. The optical film according to claim 1, further comprising a light transmission connection layer, wherein the light transmission connection layer is located between the protective film layer and the polarizing film layer, and is disposed on the side of the protective film layer facing away from the quantum rod film layer.

13. The optical film according to claim 12, wherein the light transmission connection layer has a phase deviation of zero, and has a depolarization degree less than 5%.

14. A light-emitting device, comprising a light source and an optical film, wherein the optical film comprises:
   a quantum rod film layer and a prism layer located at a light emergent side of the quantum rod film layer, wherein a first side of the prism layer is a flat surface, a second side of the prism layer is an uneven surface having a plurality of prism structures, and the first side of the prism layer directly contacts the quantum rod film layer;
   a protective film layer attached to a light incident side of the quantum rod film layer; and
   a polarizing film layer disposed on a side of the protective film layer facing away from the quantum rod film layer,
   wherein light emitted by the light source transmits through the optical film.

15. The light-emitting device according to claim 14, wherein the light emitted by the light source is blue light, and the quantum rod film layer emits blue linearly polarized light, and/or red linearly polarized light, and/or green linearly polarized light after being irradiated by the blue light.

16. A display device, comprising a light-emitting device, wherein the light-emitting device comprises:
   a quantum rod film layer and a prism layer located at a light emergent side of the quantum rod film layer, wherein a first side of the prism layer is a flat surface, a second side of the prism layer is an uneven surface having a plurality of prism structures, and the first side of the prism layer directly contacts the quantum rod film layer;
a protective film layer attached to a light incident side of the quantum rod film layer; and
a polarizing film layer disposed on a side of the protective film layer facing away from the quantum rod film layer.

17. The display device according to claim 16, further comprising a protective film layer attached to the light incident side of the quantum rod film layer.

18. The display device according to claim 16, further comprising a light transmission connection layer, wherein the light transmission connection layer is located between the protective film layer and the polarizing film layer, and is disposed on the side of the protective film layer facing away from the quantum rod film layer.

19. The display device according to claim 18, wherein the light transmission connection layer has a phase deviation of zero, and has a depolarization degree less than 5%.

20. The display device according to claim 19, further comprising:
a polarizing beam-splitting layer disposed on the side of the protective film layer facing away from the quantum rod film layer; and
a ¼ phase film layer disposed on the side of the polarizing beam-splitting layer facing away from the quantum rod film layer.

* * * * *